United States Patent [19]

Potthoff et al.

[11] Patent Number: 5,776,316
[45] Date of Patent: Jul. 7, 1998

[54] LIQUID REDISTRIBUTION SYSTEM

[75] Inventors: Richard W. Potthoff; Alan C. Burton, both of Scotch Plains, N.J.

[73] Assignee: The BOC Group, Inc., New Providence, N.J.

[21] Appl. No.: 610,818

[22] Filed: Mar. 7, 1996

[51] Int. Cl.$^6$ ........................................................ B01D 3/32
[52] U.S. Cl. ............................ 202/158; 202/239; 261/97; 261/98
[58] Field of Search .................... 202/158, 239; 261/97, 98

[56] References Cited

U.S. PATENT DOCUMENTS 4,159,291  6/1979  Bruckert et al. ..................... 261/114 R
4,557,877  12/1985  Hofstetter ................................. 261/97
4,776,989  10/1988  Harper et al. ............................ 261/97
4,994,210  2/1991  Lucero et al. ............................ 261/97
5,501,079  3/1996  Kreis et al ................................. 62/36

*Primary Examiner*—Timothy McMahon
*Attorney, Agent, or Firm*—David M. Rosenblum; Salvatore P. Pace

[57] ABSTRACT

A liquid redistribution system for redistributing liquid descending in a packed distillation column in which liquid is distributed from one side of the column to the other side of the column and vice-versa. To this end, a plurality of parallel, spaced apart liquid distributor elements provide inlet openings for receiving the liquid as it descends and outlet openings located on the underside of the distributor elements for discharging the liquid from the inlet openings. Channels provide flow communication between the inlet and outlet openings.

1 Claim, 3 Drawing Sheets

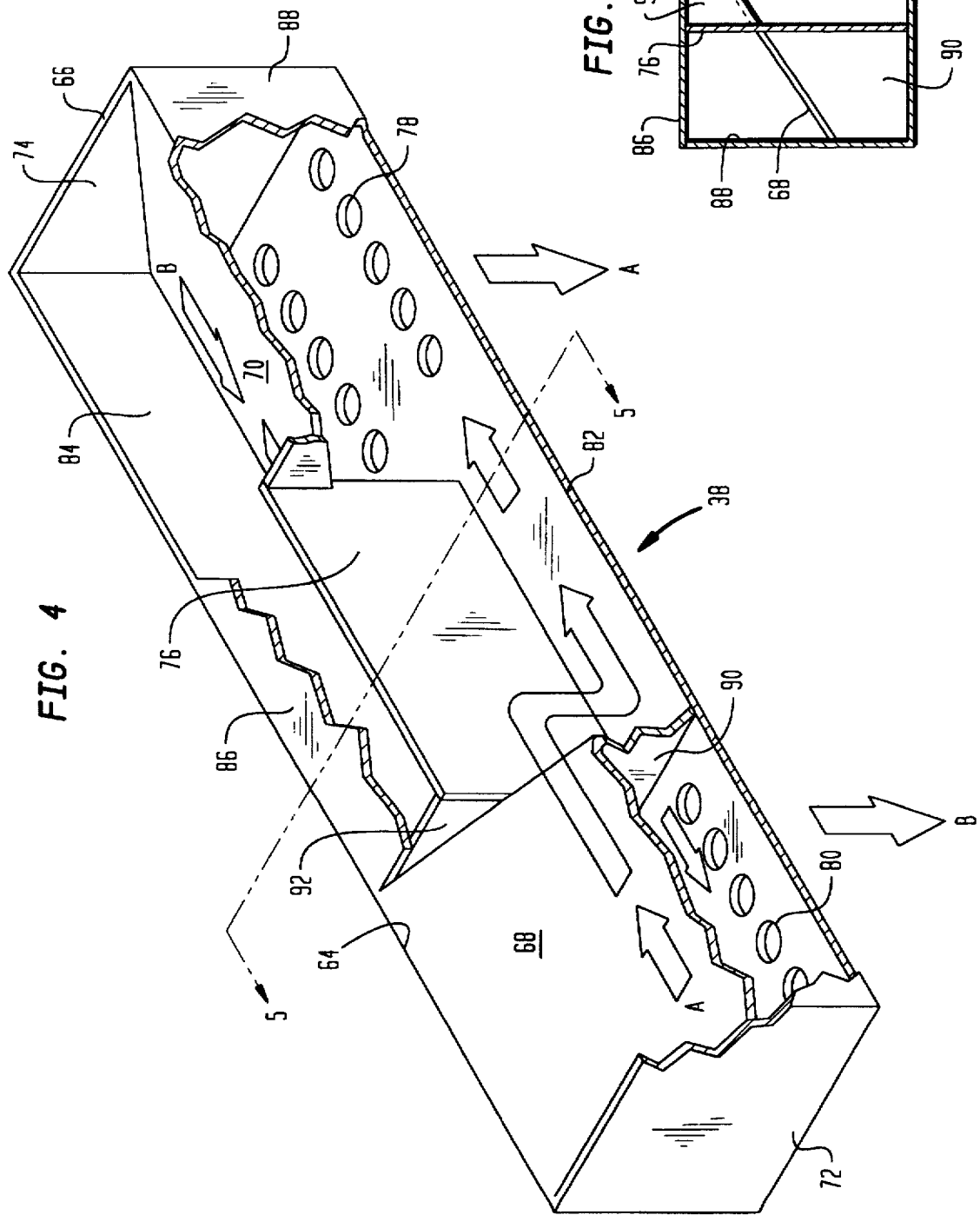

LIQUID REDISTRIBUTION SYSTEM

BACKGROUND OF THE INVENTION

The present invention relates to a liquid redistribution system for use in a packed distillation column to redistribute liquid.

In distillation of multi-component mixtures, descending liquid and ascending vapor phases are brought into intimate contact by mass transfer elements which can consist of either random packing or structured packing. Liquid is introduced into the column through a feed and is then distributed to the packing by a liquid distributor. After the liquid phases passes through, perhaps several beds of packing, the liquid is collected by a liquid collector and is discharged from the column through a liquid draw. In order to enhance the lateral mixing of the liquid (within columns that utilize multiple beds of packing between feeds and draws) intermediate liquid redistributors are provided in which liquid is collected and distributed to the next lowest bed of packing in much the same manner as a liquid distributor used in connection with a liquid feed to the column. The purpose of this is to counter mal-distribution effects by equalizing the liquid flow rate across the column and at the same time equalizing liquid composition across the column.

In the prior art, a collector is employed to collect liquid and a separate liquid distributor is provided for purposes of intermediate liquid redistribution. The disadvantage of such arrangement is that the two foregoing elements of a collector and a distributor add to the height and therefore the expense of the column. Redistributors without separate collectors do not add as much to the height and complexity of the column, but they do not appreciably laterally mix the liquid. A disadvantage of both types of intermediate distributors is that in order to function as intended, great care must be taken in their mounting in order to assure a level orientation within the column.

As will be discussed, the present invention provides a liquid distribution system that does not add as much to the height of the distillation column that provides some liquid mixing and that does not require the same degree of precision of mounting of prior art liquid distribution systems and devices.

SUMMARY OF THE INVENTION

The present invention provides a liquid redistribution system for redistributing liquid descending in a packed distillation column. The system comprises a plurality of distribution elements. Each of the distribution elements is sized to extend between two opposite transverse locations of the distillation column and has two opposed ends, first and second inlet and outlet means and two pairs of channels. The first and second inlet and outlet means for respectively receiving and discharging said liquid at the two opposed ends. The first inlet and outlet means are located at one of the two opposed ends and the second inlet and outlet means are located at the other of the two opposed ends. The two pairs of channels provide flow communication between the first and second inlet and outlet means such that the liquid received by the first inlet means is discharged from the second outlet means and the liquid received by the second inlet means is discharged from the first outlet means. The parallel distribution elements arranged with a lateral spacing therebetween to produce an open area allowing part of said liquid descending within said distillation column and vapor ascending within the distillation column to pass between said parallel distribution elements.

The present invention contains parallel distribution elements that do not add appreciably to the height of the distillation column and as will become apparent, present no special leveling problems in their installation. Additionally, mixing of the liquid is enhanced over prior art redistribution technology in that liquid is swapped between opposite locations of the distillation column.

BRIEF DESCRIPTION OF THE DRAWINGS

While the specification concludes with claims distinctly pointing out the subject matter the applicants regard as their invention, it is believed that the invention will be better understood when taken in connection with the accompanying drawings in which:

FIG. 4 is an enlarged perspective view of FIG. 3 with portions broken away to show internals of the liquid distributor element in accordance with the present invention; and FIG. 5 is a sectional view taken along line 5—5 of FIG. 4.

DETAILED DESCRIPTION

Figure 1:
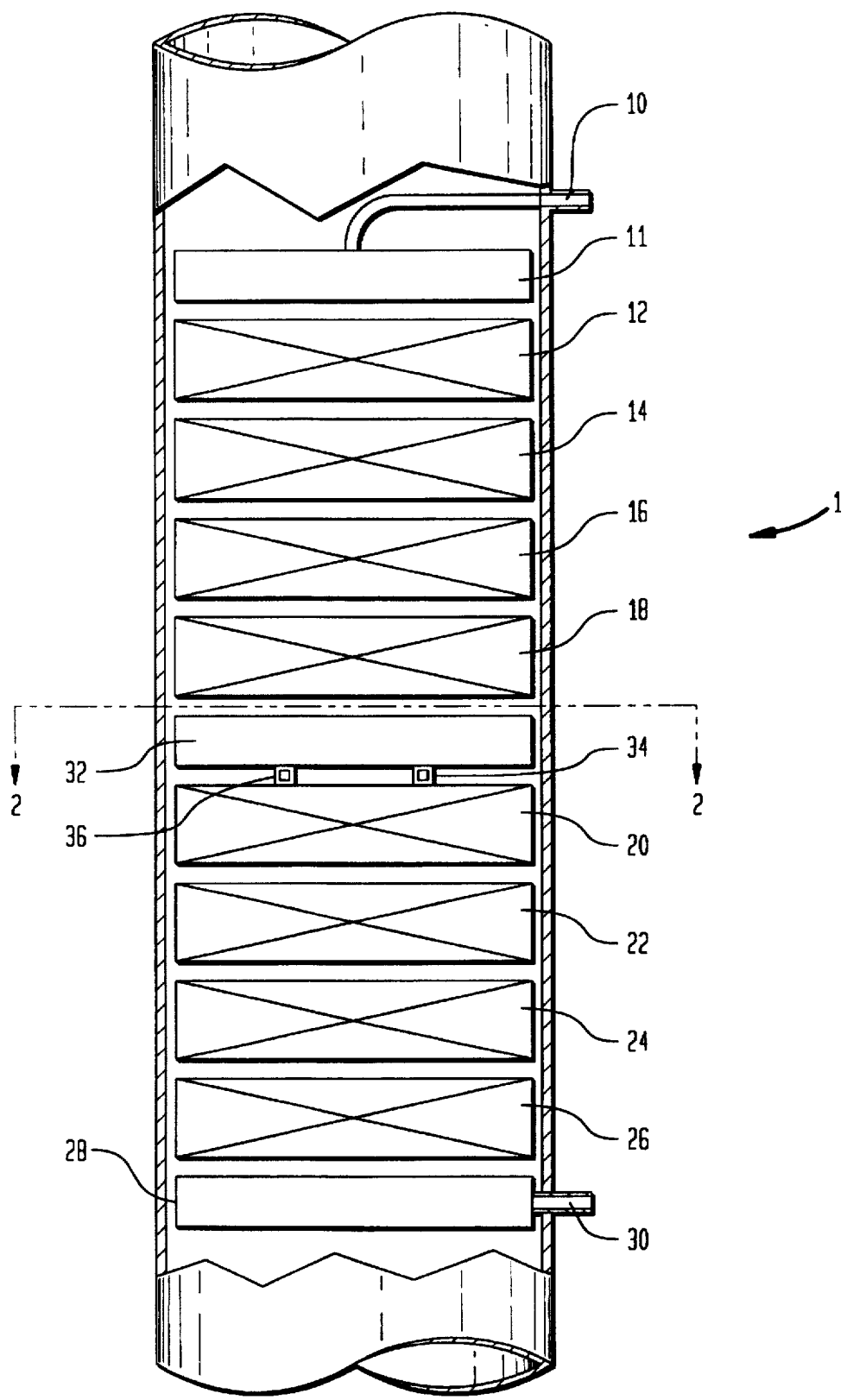
FIG. 1 is a schematic view of a packed distillation column in accordance with the present invention.

With reference to FIG. 1, a fragmentary view of a distillation column 1 is illustrated in which liquid is fed to the column by a liquid feed 10 which is in turn connected to a liquid distributor 11 to initiate production of a liquid phase. The liquid phase descends through packed beds 12, 14, 16, 18, 20, 22, 24 and 26 that contain either random or structured packing. The liquid from packed bed 26 is collected in a liquid collector 28 and is discharged at a liquid draw 30.

Liquid is redistributed between packed bed 18 and packed bed 20 by a liquid redistribution system 32 in accordance with the present invention. Liquid redistribution system 32 rests on packing bed 20 and is supported thereon by two spacer bars 34 and 36. Other types of support are possible, however, the support provided by spacer bars 34 and 36 illustrates the simplicity of installation of liquid redistribution system 32.

Figure 2:
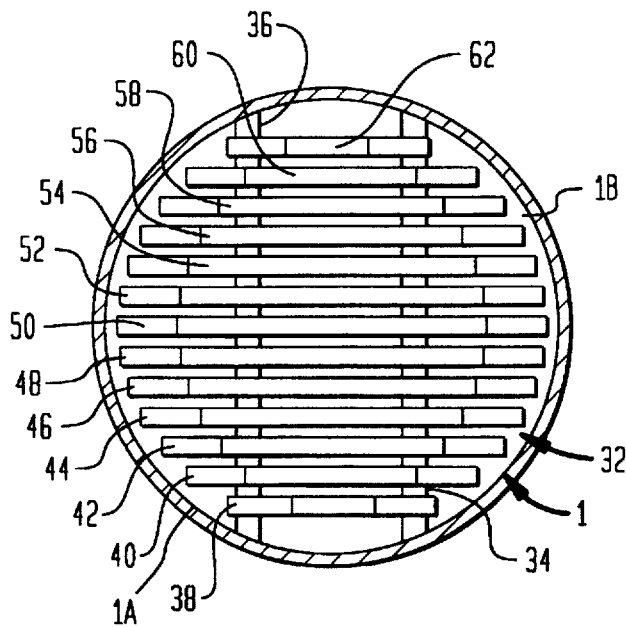
FIG. 2 is a top plan view of a liquid redistribution system in accordance with the present invention.

With reference to FIG. 2, liquid distributor system 32 consists of liquid distributor elements 38–62. Liquid distributor elements 38–62 function to redistribute liquid from side 1(A) of the column (as viewed in FIG. 2, the semi-circular region containing support bar 36) to side 1(B) of distillation column 1 (as viewed in FIG. 2, the semi-circular region containing support bar 34.) As illustrated, distributor elements 38–62 are parallel and laterally spaced apart from one another to produce an open area to allow part of the liquid phase descending within distillation column 1 and an ascending vapor phase to pass between distributor elements 38–62. The open area should preferably greater than about 25% of the total transfer cross-sectional area of any distillation column including distillation column 1.

Although liquid redistribution system 32 is made up of a plurality of individual elements, as could be appreciated by those skilled in the art, the elements could be connected to one another. Moreover, although liquid redistribution system 32 employs distribution elements that each distribute liquid between sides 1(A) and 1(B) of distillation column 1, smaller distributor elements could be utilized so that liquid were distributed between opposite locations that would not necessarily be located on opposite sides 1(A) and 1(B). For instance, instead of using a single distribution element 50, three elements of about the size of distribution element 38 could be placed end to end. Other distribution elements illustrated in FIG. 2 could be similarly replaced. Also, elements having about the size of distribution element 38 could be used to fill a transverse section of distillation column 1 in a brickwork-like pattern.

Figure 3:
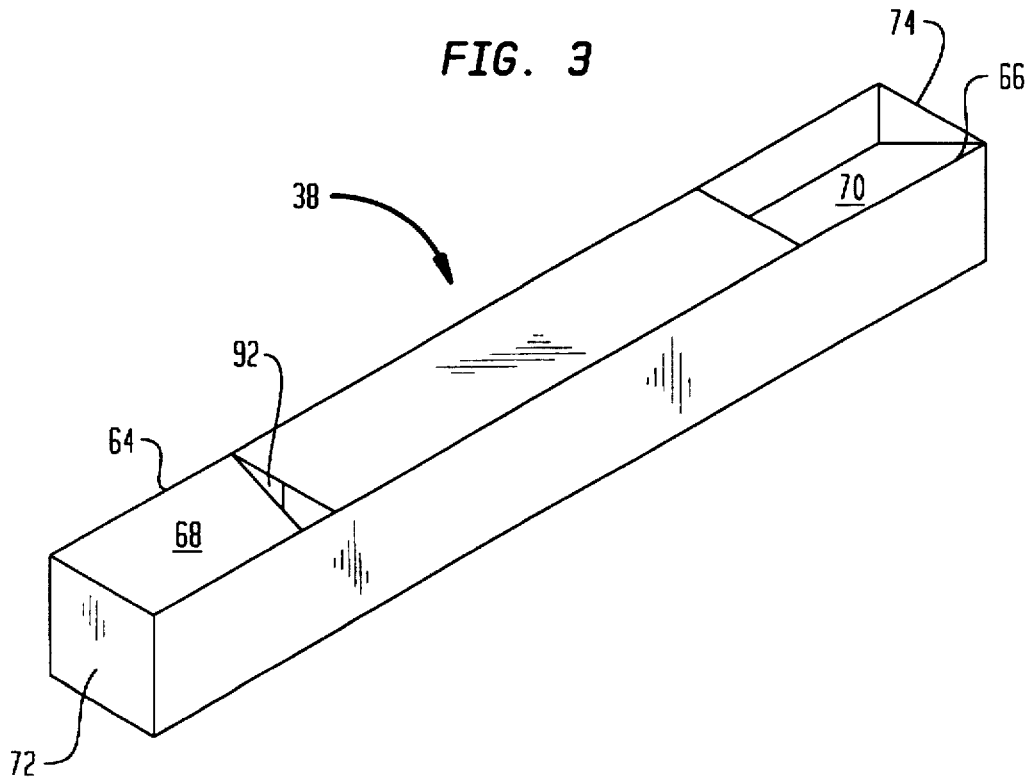
FIG. 3 is a distributor element used within the liquid redistribution system illustrated in FIG. 2.

With reference to FIGS. 3 and 4, distributor element 38 is illustrated for exemplary purposes. Liquid descending on sides 1(A) and 1(B) of distillation column 1 is respectively introduced into inlet openings 64 and 66 of rectangular configuration. Inlet opening 64 is provided with a sloping floor 68 and inlet opening 66 is provided with a sloping floor 70 to provide two opposed wedge-shaped, weir-like pockets defined within end regions located at the two opposed ends 72 and 74 of distributor element 38. As indicated by arrowheads "A", liquid flows from inclined floor element 68 through a channel formed on one side of a partition plate 76. The liquid then is discharged from at the end region (at end 74) of distributor element 38 through openings 78. As indicated by arrowheads "B", Liquid collected within inlet opening 66 flows downwardly on inclined surface 70 to another channel formed on the other side of partition plate 76. Liquid "B" thereafter is discharged from distributor element 38 through outlet openings 80 formed on the underside thereof at the end region thereof located at end 72.

With additional reference to FIG. 5, each distributor element can be formed by an elongated box having lengthwise extending sides 82, 84, 86 and 88. Bulkheads 90 and 92 are provided to prevent liquid "A" from flowing back into outlet openings 80. Like bulkheads are provided for the liquid "B" to prevent such from flowing back into outlet openings 78.

The width of each distributor element should not exceed about 20 centimeters for even large installations. The minimum length of a distributor element should be no less than about 1 meter or in smaller columns not less than one-half the diameter of a column whichever is smaller.

Although the present invention has been described with reference to preferred embodiment, as will occur to those skilled in the art, numerous changes, additions and omissions can be made without departing from the spirit and scope of the present invention.

We claim:

1. A liquid redistribution system for redistributing liquid descending in a distillation column, said system comprising:

a plurality of parallel distribution elements, each sized to extend between two opposite transverse locations of said distillation column situated on opposite sides of said distillation column;

each of said parallel distribution elements having,
two opposed ends,
a rectangular transverse cross-section,
first and second inlet means for receiving said liquid at said two opposed ends, the first and second inlet means comprising a pair of rectangularly configured open, upper end regions of said distributor elements,
two inclined floor elements located directly beneath said open, upper end regions to provide two opposed weirs to catch said liquid,
first and second outlet means for discharging said liquid at said two opposed ends, the first and second outlet means comprising a pair of arrays of openings defined on lower end regions of said distributor elements,
the first inlet and outlet means located at one of the two opposed ends and the second inlet and outlet means located at the other of the two opposed ends, and
a pair of parallel channels providing flow communication between said first and second inlet and outlet means such that said liquid received by said first inlet means is discharged from said second outlet means and said liquid received by said second inlet means is discharged from said first outlet means, the pair of parallel channels defined by a rectangular partition extending between said two weirs; and said parallel distribution elements arranged with a lateral spacing therebetween to produce an open area allowing part of said liquid descending within said distillation column and vapor ascending within said distillation column to pass between said parallel distribution elements.

* * * * *